US 6,341,550 B1

(12) United States Patent
White

(10) Patent No.: US 6,341,550 B1
(45) Date of Patent: *Jan. 29, 2002

(54) ELECTROBRAID FENCE

(76) Inventor: Eric White, 5124 Highway 14, Hants County, Nova Scotia (CA), B0N 1M4

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/304,722

(22) Filed: May 4, 1999

Related U.S. Application Data

(63) Continuation of application No. PCT/CA97/00820, filed on Nov. 3, 1997, and a continuation of application No. 08/824,973, filed on Mar. 29, 1997, now abandoned.

(30) Foreign Application Priority Data

Nov. 4, 1996 (CA) ............................................. 2189513

(51) Int. Cl.⁷ ................................................. D04C 1/00
(52) U.S. Cl. ............................. 87/5; 87/6; 87/8; 87/13; 256/10
(58) Field of Search ............................. 256/10; 87/5, 6, 87/8, 13

(56) References Cited

U.S. PATENT DOCUMENTS

| 3,291,897 A | 12/1966 | Bramley | 256/10 |
| 3,504,892 A | 4/1970 | Crist | 256/10 |
| 3,805,667 A | 4/1974 | Orser | 87/6 |
| 3,980,277 A | 9/1976 | Enoksson | 256/10 |
| 4,162,783 A | 7/1979 | Crist, Jr. | 256/10 |
| 4,494,733 A | 1/1985 | Olsson | 256/10 |
| 4,728,080 A | 3/1988 | Kurschner et al. | 256/10 |
| 4,819,914 A | 4/1989 | Moore | 256/10 |
| 4,860,996 A | 8/1989 | Robbins, III | 256/10 |
| 4,905,969 A | 3/1990 | Kurschner et al. | 256/10 |
| 4,973,029 A | 11/1990 | Robbins, III | 256/10 |
| 5,036,166 A | 7/1991 | Monopoli | 256/10 |
| 5,414,211 A | * 5/1995 | Chan | 174/36 |
| 5,957,434 A | * 9/1999 | Nilsson | 256/10 |

FOREIGN PATENT DOCUMENTS

| AU | 653698 | 10/1994 |
| DE | 4402144 | 9/1994 |
| EP | 256841 | 2/1988 |
| FR | 2564681 | 11/1985 |
| FR | 2625599 | 7/1989 |
| FR | 2642222 | 7/1990 |
| GB | 748559 | 5/1956 |
| GB | 2321762 | * 11/1997 |

* cited by examiner

Primary Examiner—John J. Calvert
Assistant Examiner—Shaun R Hurley
(74) Attorney, Agent, or Firm—Sughrue Mion, PLLC

(57) ABSTRACT

A light weight, strong and flexible, braided electrical fence rope, for fences to contain livestock and keep unwanted animals out, combines in its outer braided jacket electrically conductive elements with high strength non-conductive elements in a double helix configuration. The outer braided jacket will preferably surround an inner core of non-conductive high strength elements. The high strength non-conductive elements and the physical properties of the braided rope construction provide inherent strength and flexibility properties to the fence rope. The conductive elements in the outer braided jacket are selected to provide an effective electric shock when contacted by an animal. This electric fence rope combines barrier strength and psychological deterrence to both domestic and wild animals.

56 Claims, 3 Drawing Sheets

ELECTROBRAID FENCE

RELATED APPLICATIONS

This is a continuation of International Application No. PCT/CA97/00820 filed Nov. 3, 1997, and of U.S. Application Ser. No. 08/824,973 filed Mar. 27, 1997 now abandoned, and of Canadian patent application Ser. No. 2,189,513 filed Nov. 4, 1996.

FIELD OF THE INVENTION

This invention relates to a braided electric fence rope for use in fences, or as the fence itself, to contain livestock within an enclosure, and to keep unwanted animals out of an enclosure or from crossing the fence or other barrier.

BACKGROUND OF THE INVENTION

Traditional fences are barrier type fences which attempt to keep animals in or out of the enclosure by creating an immovable barrier. Stone walls and wood were the early materials of choice. Barbed wire and high tensile wire have been widely used for many years. Vinyl board fence and wire mesh fence are more recent developments. Recycled rubber, rigid pipe, polymer coated wire and extruded polymer (non-metallic) wire are all used today as fence materials.

Fences have always presented problems. They are expensive to build and troublesome to maintain. When a weak link is found, or created, by an animal, or by a falling tree, the fence is penetrated. When a fence is penetrated, animals escape from the enclosure with the risk of serious injury to animals or people, and potential loss of the animals.

Animals, particularly horses, can both damage and be damaged by traditional fence materials. Horses can kick through wood fences, chew wood until it is severed, get puncture wounds from wood splinters, nails and loose wire ends, get cut by wire, and get serious injuries from loose ends of wire which tangle around their legs.

The most frustrating problems to farmers are the time, trouble and cost to erect traditional fences, and the constant need to repair them.

Electric fence technology introduced a psychological deterrent to fences. An animal does not like to receive an electric shock. Electric fences are used as additional deterrents to supplement and protect traditional fences made of wood or wire or plastic.

Several attempts have been made to devise a strong and durable electric fence, suitable for use as a permanent fence. Electrified high tensile wire on posts has been widely used as permanent electric fencing, but it has several disadvantages. Wire is heavy and cumbersome to install and repair. Wire expands as the temperature increases requiring tightening, then contracts with reduced temperature which creates tensional strain and leads to breakage. In addition, wire is inelastic and can be snapped by a sharply applied force. Wire is hard for animals to see against woods and typical farm backgrounds, it rusts, and can cut animals and cause puncture wounds.

Another type of electric fence rope is made by twisting wire conductors with strands of fibreglass or polymer fibres to form a twisted rope. The disadvantage is that twisted rope tends to "unlay" under tension and to elongate. The fence rope must then be retightened, which restores tension but causes the rope to unlay further. The wire is generally lightweight and inclined to break under tension, particularly when the fibre stretches and the wire does not. Increasing the size of the wire conductor increases the weight and the cost of the fence rope. Substituting a high strength metal wire, such as stainless steel, for a low strength conductive wire, such as copper, reduces the electrical conductivity of the fence line, because the stainless steel is much less conductive than copper.

A further type of electric fence line comprises tapes woven from a plurality of textile or fibreglass threads with electrically conductive filaments of wire woven-in longitudinally, as disclosed by Olsson in U.S. Pat. No. 4,449,733. Such wire could tend to break under tension.

An electric fence line is disclosed by Monopoli in U.S. Pat. No. 5,036,166. In reviewing the art, Monopoli stated that prior electric fences are encumbered with the major disadvantage that they employ relatively fragile electrical conductors of low tensile strength, which are also prone to work hardening and consequential breakage, particularly at points along the line where the line has been knotted or twisted, subjected to abrasion or to tensional forces in the line. The patent is directed to overcoming such problems by loosely incorporating highly conductive strands into the fence line and by incorporating an additional electrically conductive strand of high strength into the fence line in touching relationship with the highly conductive strands. Thus the fence has a highly electrically conductive metal strand, such as copper, with at least one high strength metal strand of lower conductivity, such as stainless steel. The metal strands are oriented in touching relation so that in the event of breakage of the highly conductive strand, the high strength metal strand will bridge the break with only a minimal increase in the total electrical resistance of the fence line.

Another type of electric fence rope, disclosed by Moore in U.S. Pat. No. 4,819,914, comprises an inner core of stranded wire conductor cable and an outer insulating layer of braided synthetic fibre elements that completely surround and physically isolate the conductor cable so that no conductive portion of the conductor cable is exposed. It is disclosed that even though these synthetic fibre elements insulate the cable, the fence rope will still provide an electric shock to an animal contacting these outer synthetic fibre elements. However, it is apparent that the shock could not be as effective as if the conductor was not insulated. Also, in practice, because the inner core cable is heavy and tiff, this fence rope is difficult to work with.

Similarly, Orser, in U.S. Pat. No. 3,805,667, has disclosed a braided rope in which an electrical conductor runs longitudinally within each strand comprised of a plurality of yarns, and each strand is enclosed within a tubular braided cover. The plurality of tubular braided strands are then plaited together, but the electrical conductor is not exposed.

Electric fence ropes developed in the form patented by Moore and Orser have the serious disadvantage that the conductive elements are buried within non-conductive elements which insulate the conductors from providing the maximum electrical shock to an animal contacting the rope. In consequence the electrical conductor is made larger and heavier to reduce its electrical resistance, as in Moore's stranded wire cable, and the rope becomes inflexible and stiff to handle.

Composite electric fence lines are typically used only for portable and temporary fences within permanent fences because of the lightweight materials employed. Most electric fence line products on the market tend to break easily, and the package labels frequently warn that these types of fences must only be used within permanent fencing.

The best of traditional fence systems leave much to be desired. The demand for improved fencing is world wide, in a host of applications. Every domestic animal must be contained as cost effectively and safely as possible. Farmers need a stronger, more easily handled portable fence for rotational grazing. Farm crops and stored hay need more effective protection from animals, including deer and elk in some areas. Grazing animals must be kept back from the shores of lakes and rivers to reduce riverbank erosion. A solution needs to be found to the increasing number of highway traffic accidents caused by moose-vehicle and deer-vehicle collisions.

SUMMARY OF THE INVENTION

It is an object of an aspect of this invention to provide an improved electric fence rope with the inherent strength and resilience to not break under the normal applied forces from animals and other impacts, while providing an electrical shock to deter animals from contacting the fence.

Accordingly, an aspect of the present invention provides a braided rope for an electrical fence comprising an exterior layer of electrically conductive elements in the form of wires and non-conductive elements in the form of synthetic fibres, said electrically conductive elements and non-conductive elements being braided together to form the exterior layer such that the electrically conductive elements are in a helical configuration, said rope being electrically conductive between opposed ends thereof.

In a preferred embodiment, the exterior layer of the braided fence rope is constructed around an inner core of high strength non-conductive elements, such as polymer fibres.

Another aspect of the present invention provides an electrically conductive rope for an electric fence comprising a cylindrical tightly woven braided exterior layer, said braided exterior layer being formed from a plurality of elements, at least two of which are conductive elements and the remainder of which are non-conductive elements, each of said conductive elements being a plurality of electrically conductive wires and said conductive and non-conductive elements being braided to form said cylindrical tightly woven braided exterior layer such that the conductive elements are helically wound with opposed orientations, said conductive elements being on the surface of the exterior layer and being in electrical contact at periodic intervals along the exterior layer, said flexible rope optionally having an inner core of non-conductive synthetic fibres.

In a preferred embodiment of the present invention, the braided exterior layer is formed from 8–32 braided elements, preferably 16 braided elements, and especially where two of the braided elements are conductive elements.

In another embodiment, the fence rope has a breaking strength of at least 400 kg and an elongation at break of 15–20%.

In a further embodiment, the braiding of the fence rope is formed with a tightness of 4–32 pics/inch, especially 8 pics/inch.

In yet another embodiment, the fence rope is capable of being twisted, knotted, tied or bent.

In preferred embodiments, the conductive elements are a plurality of copper wires, especially 3–8 copper wires in each twisted strand, in which the copper wires are of a gauge of 20 or smaller, especially in the range of 20–40, most preferably 30 gauge, gauge being defined by the American Wire Gauge Standard. The copper wires are preferably twisted together into two or more strands.

In further preferred embodiments, the non-conductive elements are formed from fibres of polypropylene, polyamide or polyester.

In another embodiment, the fence rope does not undergo a change in length with changes in ambient temperature.

In a further embodiment, subjecting the fence rope to a load in tension of up to 200 kg and subsequently releasing such load does not cause an increase in the 30 length of the fence rope.

In other embodiments, the braid is a marine yacht braid as used for sail halyards and spinnaker sheets.

BRIEF DESCRIPTION OF THE DRAWINGS

The present invention is illustrated by the embodiments shown in the drawings, in which.

DETAILED DESCRIPTION

This invention is directed to a rope for an electrical fence, which comprises in combination an outer layer of strands of non-conductive elements e.g. high tenacity filaments, combined in a braided fashion with strands of conductive material, and optionally an inner rope core of non-conductive elements e.g. high tenacity filaments. The strands of the conductive and non-conductive elements would normally be in separated braided elements, but such strands of conductive and non-conductive elements may be combined in one or more, or each, of the elements braided together. It is understood that the non-conductive elements are the major part of the rope.

The present invention provides a fence rope which combines the high strength and flexibility of the non-conductive material with the advantage of being able to carry an electric shock as an added deterrent to animals. The fence rope thus combines strength, flexibility and conductivity in a braided rope that is easy to handle.

The rope may have a core enveloped by the braided exterior layer, or it may have the braided exterior layer without the core. Both embodiments are discussed herein, but the invention will be particularly described with reference to a rope with a core.

Figure 1:
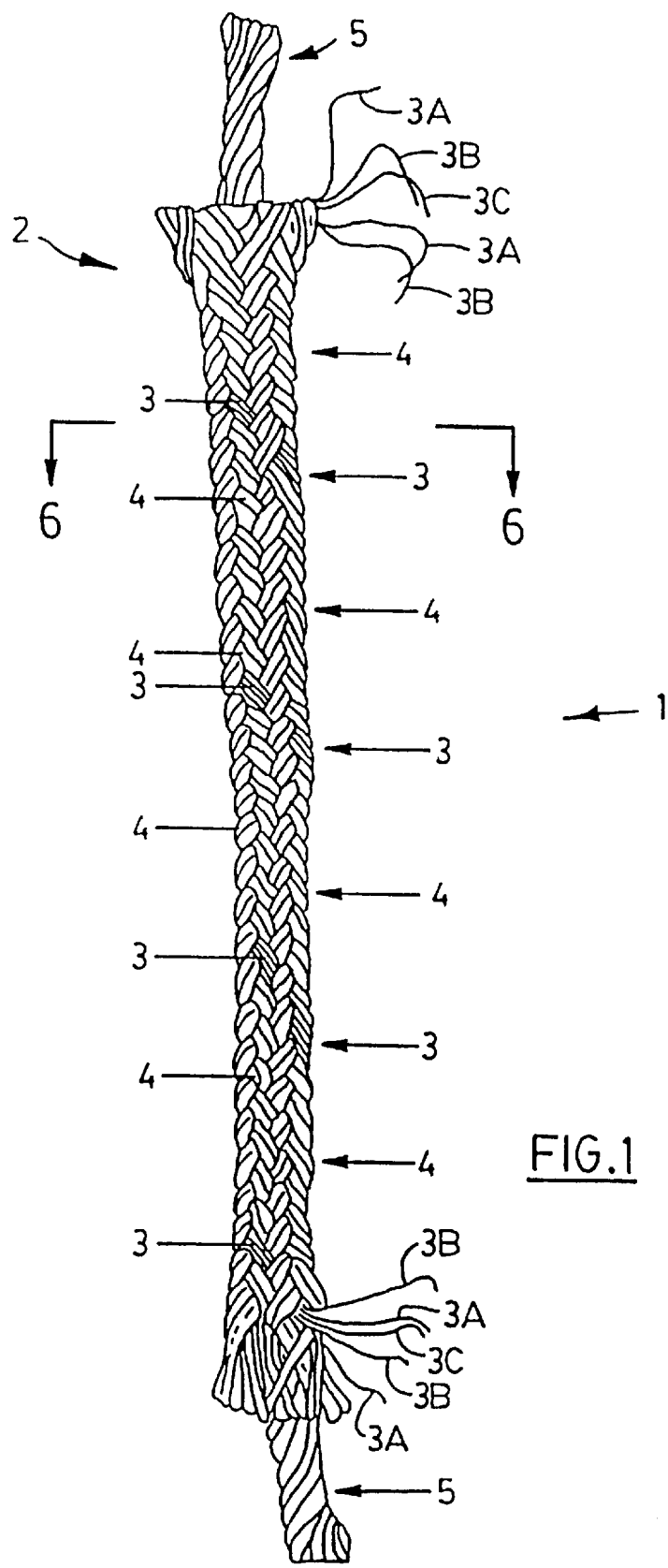
FIG. 1 is a schematic representation of a longitudinal, partly sectioned view of a fence rope.

Referring to the embodiment shown in FIG. 1, the fence rope, generally indicated by 1, comprises an inner core 5, and an outer braided jacket 2. Outer braided jacket 2 encases inner core 5.

Inner core 5 is preferably constructed from multiple strands of high tenacity fibres using conventional rope making techniques. The strands may comprise extruded monofilaments in flattened, square, oval, round or other shapes, or yarns of twisted fibres, including fibres formed from synthetic polymers such as polypropylene, nylon (polyamide) and polyester. The inner core can be straight, or twisted or of braided construction.

Figure 2:
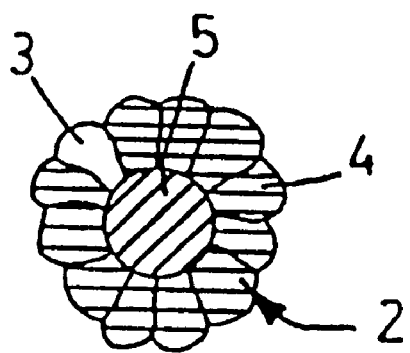
FIG. 2 is a schematic representation of a sectional view taken through a cross-section of the fence rope in FIG. 1; rope
Figure 3:
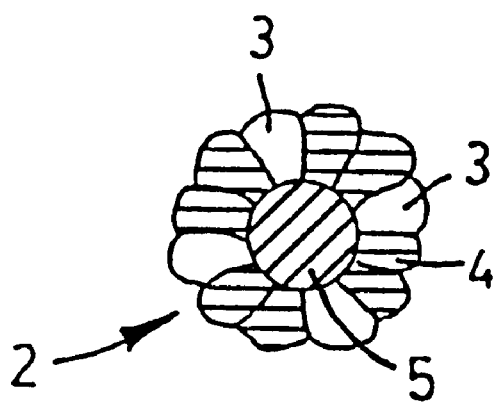
FIG. 3 is a schematic representation of a cross-section of an alternative construction of the rope.

As illustrated by the embodiments in FIGS. 1, 2 and 3, the braided elements making up the outer braided jacket 2 may be of two types.

The first type of braided element, as at 3 in the Figures, is an electrically conductive element comprised of a single conductive element, or especially of a strand of conductive filaments, preferably twisted together. A very conductive element is copper, which is preferred, but any one of a number of other highly conductive elements may be used e.g. copper alloys, copper coated on another metal, or copper with a coating of another metal, as well as many other conductive metals. The conductive element should exhibit relatively low electrical resistance. The conductive elements may be combined with non-conductive filaments, provided that the resultant element in the braided exterior layer still serves the purpose described herein of providing an electrical charge on the exterior surface of the fence rope.

As is shown in FIG. 1, not all of the strands in the braided element 3 need to be conductive. For example, those of 3A can be conductive and those of 3B non-conductive. The remaining strand 3C is a coloured tracer for visibility purposes. A similar coloured strand or strands can also be included in the braid element 4. Such coloured strands are optional.

The second type of braided element, as at 4, would normally not contain any conductive filaments, but may do so as discussed above. This type of braided element is typically constructed from suitable strands of non-conductive fibres, which could be the same as, or different from, those used in core 5. These braided non-conductive elements may be coloured, or may include a coloured tracer to increase visibility of the fence rope, such coloured elements being optional.

Alternative constructions are shown in FIGS. 2 and 3. In FIG. 2, as is in FIG. 1, there is only one braided element 3 in the outer jacket that includes conductive filaments. In this construction, it is preferred that this single conductive element be made entirely of conductive filaments. In FIG. 3, there are several braided elements 3, and each may be made only of conductive filaments or of a combination of both conductive and non-conductive filaments. In either construction, there must be sufficient conductivity to serve the purpose of the electric fence rope.

Figure 4:
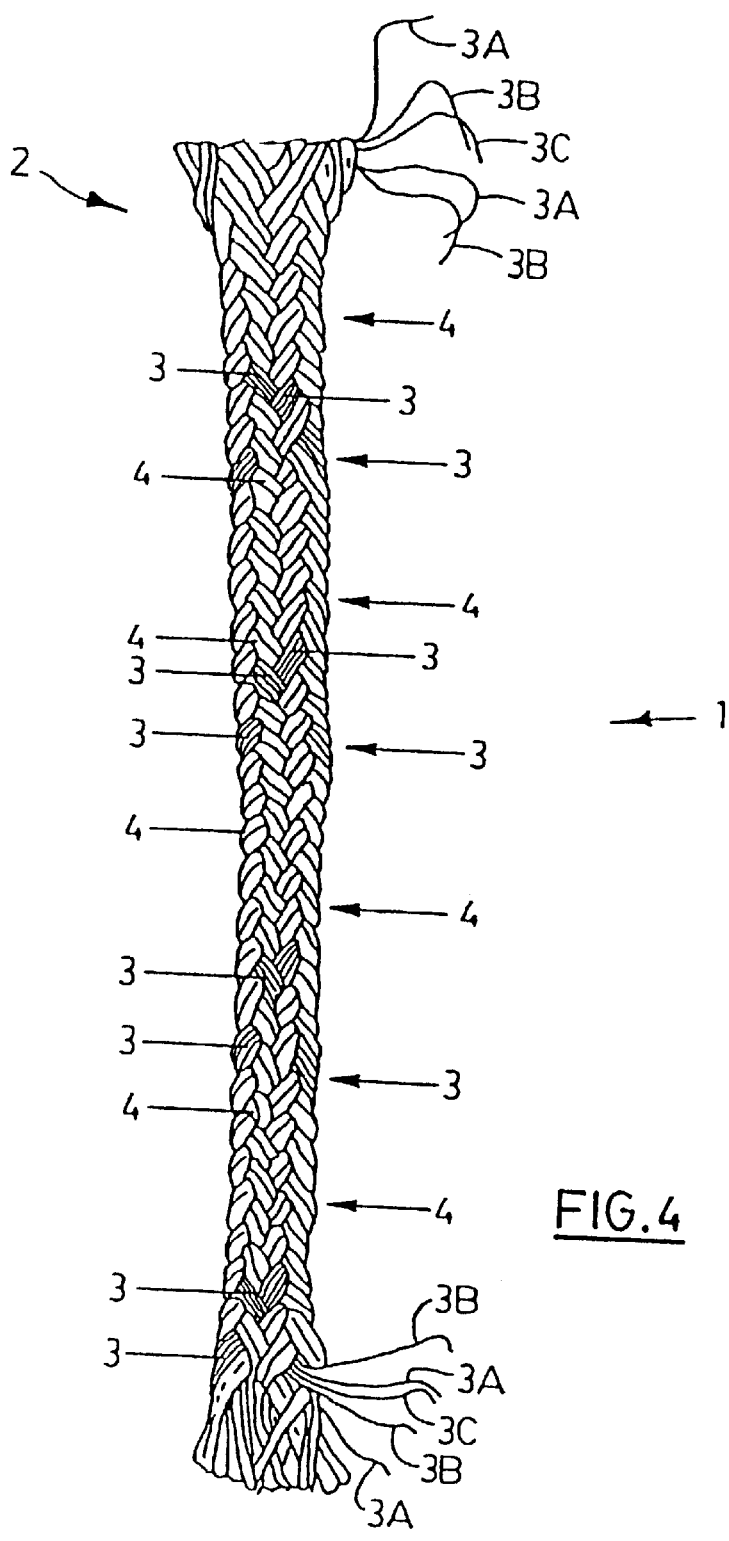
FIG. 4 is a schematic representation of a longitudinal, partly to sectioned view of a fence rope similar to FIG. 1, but having two electrically conductive elements.

Although only one conductive element is shown in FIGS. 1 and 2, the use of two conductive elements is the preferred construction. The conductive element of FIGS. 1 and 2 is braided in a counter-clockwise helix, when viewed from the bottom of FIG. 1. As illustrated in FIG. 4, a second conductive element could be added and, if so, would be braided in a clockwise helix. The remaining non-conductive elements would be braided half in counter-clockwise helix, and half in clockwise helix.

It will be appreciated that a variety of materials may be used and that the construction of the rope of this invention can vary. There are many materials which are suited to be either the core or carrier materials, for both the conductive and non-conductive filaments. Such materials will be understood by persons skilled in the art.

As noted above, the conductive filaments are preferably copper, as such filaments are good conductors of electricity, are not readily corroded, and are readily available. Other metals can also be used, examples of which are disclosed herein.

The non-conductive filaments can be chosen from a wide range of synthetic polymer fibres. It is possible to use filaments conventionally used in the manufacture of rope, either as monofilament or as a spun yarn. Preferred materials are polypropylene, polyamides and polyesters, as either monofilaments or spun yarns or co-extruded high strength polypropylene and polyethylene as a monofilament e.g. POLYSTEEL™ monofilament. A preferred polyester fibre is Allied Signal high tenacity yarn 1W70, which is used in the manufacture of automotive seat belts. Seat belts used in restraint systems must be in compliance with the high standards imposed thereon, including strength, abrasion resistance, elongation, colourfastness, and resistance to ultraviolet light and microorganisms. The preferred fibre is 1,000 denier, and has a specified breaking strength of 9.2 kg, tenacity of 9.2 gms/denier, toughness of 0.71 gms/denier and 14% elongation at break.

Other synthetic fibres may be used, including SPECTRA™ fibres of ultrahigh molecular weight polyethylene, aramid fibres e.g KEVLAR™ and NOMEX™ fibres and DACRON™ polyester fibres, and other fibres noted herein. It will also be appreciated that other synthetic fibres may be used, depending on the proposed end-use.

The double helix configuration of the conductive element protects relatively low strength conductors, such as copper, from tensional strain. When strain is imposed on the fence rope, the fence rope will stretch but, as the fence rope stretches, the copper conductor uncoils in the manner of a coiled spring i.e. it uncoils in the manner of a "SLINKY"™ toy, with little longitudinal tension on the copper wire itself. As tension increases, the fibre elements in the outer braided jacket tend to clamp onto the inner core, and the combination of forces in the braided construction inhibits stretching of the fence rope. The high strength non-conductive fibres, together with the braided construction, provide the fence rope with inherent strength, while the copper conductors provide an effective electric shock.

In preferred embodiments of the fence rope of this invention, the tendency of the relatively fragile copper to break is preferably further reduced, first, by using a substantially larger copper wire than might otherwise be used, such as 30 gauge, second, by using ten copper wires of this large gauge instead of only a few copper wires of smaller gauge, third, by twisting the copper wires into strands of five wires each because twisted strands are stronger and tougher than individual wires, and fourth, by placing the twisted copper wires into a suitable helical configuration. The helix allows the copper conductor to act like a coiled spring, which simply uncoils when the fence rope is tensioned, with very little longitudinal tension on the copper wires to cause the wire to break, particularly when the elongation of the fence rope is less than ten percent.

In preferred embodiments of the present invention, the braided elements are formed on equipment used to braid ropes for the marine yachting industry, e.g. for sail halyards and spinnaker sheets.

The core, if present, may be fabricated by conventional rope making techniques e.g. from any non-conductive high tenacity filaments, and can be either straight, twisted or braided. The fibres of the core may be the same or different from the fibres of the braided exterior layer.

The conductive filaments are incorporated into the braided elements in sufficient number to carry the electric charge. If there is a single braided outer layer, a plurality of conductive filaments e.g. flexible metal filaments, will normally be required. The conductive elements may be in one or preferably two of the braided elements, although as discussed above more or all of the braided elements could have conductive elements. Each of such conductive braided elements may conveniently contain at least one, and preferably several, conductive filaments. Alternatively, one braided element can be made up entirely of conductive filaments. If there is more than one braided layer, at least the outer layer must contain conductive elements.

One or more fluorescent elements, or one or more light reflective elements, may be incorporated in the braided outer jacket to impart greater visibility to the fence rope in relative darkness or at night from the light of the moon or from moving vehicles or from other light sources. If desired, the high tenacity filaments in the outer layer can be coloured with pigments, including high visibility colours. The high tenacity filaments can also be chosen to provide adequate flexibility in subzero temperature environments.

Field trials without electricity, and laboratory break-strength tests, demonstrate that the double helix construction of this braided fence rope protects the conductive elements, including pure copper wire conductors, from breaking despite the substantial forces imposed on the fence by the largest domestic animals, such as stallions and bulls, or by typical farm operations.

The conductive elements of the electric fence rope of this invention have been demonstrated in field trials and laboratory tests not to fatigue fracture or to work harden and break, or to break from abrasion, when installed as a permanent fence. Where the fence rope is exposed to abrasion, only the outermost individual strand or strands is subject to being broken. If one entire twisted strand is broken, then the second twisted strand of copper filaments on the opposite side of the fence rope will likely remain intact and maintain conductivity. If the entire fence rope is severed, it can be easily and effectively repaired by inserting both ends of the fence rope into a short piece of copper tubing of slightly larger inside diameter than the outer diameter of the fence rope, and crimping, or by using a copper or other metal clamp, or by a copper or other metal U-bolt.

Due to the braided construction and the availability of high strength synthetic fibres, such as polyester, the braided fence rope of this invention can maintain its dimensional stability, in particular, its length, without sagging or becoming slack, notwithstanding temperature changes, wind, snow, and ice, and the typical animal impacts and forces imposed in normal farm operations.

In one aspect of the invention, the electric fence rope is designed for minimum stretch and creep. In another aspect, the electric fence rope is designed for significant elasticity. In the first aspect, the non-conductive elements of the inner core are selected for their dimensional stability and relative in-elasticity. In the second aspect, the non-conductive elements in the inner core are selected for their elasticity, and the braided construction design selected for the outer jacket will be a tightly coiled helix in the outer coil that will simply expand by uncoiling, allowing the braided jacket to stretch without imposing excessive tensional strain on the conductive elements in the braided jacket.

In a preferred embodiment, the conductive elements are strands of multiple filaments of wire, such as pure copper, and the non-conductive elements in the outer layer are fibres selected for their resistance to abrasion, to ultraviolet light, and to chemical attack, e.g. polyester.

Figure 5:
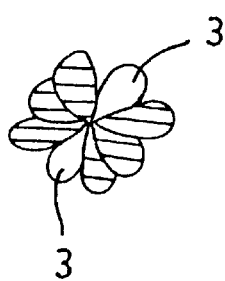
FIG. 5 is a schematic representation of a sectional view taken through a cross-section of a fence rope of the invention similar to FIG. 2, but being constructed with no inner core.

In embodiment schematically illustrated in FIG. 5, there is no inner core. Such an embodiment may be used especially if the outer layer is constructed tightly or if the fence rope is of smaller diameter overall. Inner cores and outer braided layers add tensile and/or breaking strength to the rope, especially if required for certain end-uses.

For operation, the rope may be connected to a standard electric fence charger, properly grounded, using appropriate clamps or connectors. The rope may be added to existing fences, e.g. using conventional electric fence insulators; or used as the sole fencing material. Conventional electric fence insulators may be used, as required. It may be used in single rope, multi-rope or other construction, as required. It has the strength to be used alone, or in multi-rope configurations, with large animals e.g. horses and cattle.

The fence rope of this invention may be connected by knotting or crimping or fastening lengths with wire clamps or fasteners, to form loosely or tightly woven nets which can be electrified for more secure control of animals, especially animals smaller than horses or cattle, including deer, rabbits or fox, and even squirrels. The holes formed by the nets may be rectangular, hexagonal or other shapes.

The materials and the design used for the electric fence rope of this invention may be selected from a number of alternatives for each of many, varied fence requirements, including varying the shape, size and construction of each of the elements and the overall diameter and weight of the fence rope. The braid configuration can be a tightly coiled helix, like a coiled spring, or a long, open helix, like an open spring. The inner core can be braided fibres, straight fibres or twisted fibres, or the inner core may be omitted. The materials selected for the inner core may be dimensionally very stable or elastic. One or more braided jackets may be used, and these may be braided integrally together for increased strength, with the electrically conductive elements in the exterior layer.

The fence rope is relatively soft, flexible, and light weight; it resists rot, mildew, UV, or chemical breakdown, and can be coloured to make it highly visible. It is of very high strength and has proven in testing to contain animals without electric shocks. It has been tested in areas where some fence posts are up to 50 meters apart, thus saving on the cost of posts, equipment and labour. As a consequence of the softness and flexibility of the rope, animals which run into it are normally not harmed. On such an impact the fence rope is sufficiently resilient to not cut, and it subsequently returns to essentially its original length. Due to the braided construction, the fence rope does not sag or become slack under applied tension, as occurs with twisted materials. As the tension increases the outer braided elements tend to clamp onto the inner core, thereby inhibiting any stretching by the inner core.

Twisted materials tend to stretch when tension is applied due to the fact that they "unlay", and have a tendency to become straight, losing strength in the process. More and more tension is required to keep twisted materials tight, and this causes problems in keeping fence posts in place. The fence rope of this invention does not require as much tension to keep it taut, and does not tend to elongate under tension, thus reducing maintenance.

The braided electric fence rope of this invention has strength and resilience to permit spacing fence posts at greater distances apart. Any impact of an animal collision is absorbed by the fence rope, similar to ropes in a boxing ring, and the animal is normally restrained without the fence rope breaking or the animal being hurt. Although an animal may chew it, the animal will not do so if the fence is electrified. As a result of resilience to contain an animal, and being electrified, the fence rope of the invention does not have to be tightened mechanically, but may be tightened by hand using a rope ratchet or manual fence tightener.

The present invention is illustrated as follows:

A 5/16 inch diameter braided rope was produced on an 8 carrier braiding machine at 5 pics per inch. The non-conductive elements were comprised of several flattened monofilaments of POLYSTEEL™ trade name for co-extruded high strength polypropylene and polyethylene, gathered into 7 non-conductive elements. Other monofilaments with similar properties are available under the trademarks Garfil MAXIMAL™ and DANLINE™. A single conductive element having six ends of tin-coated copper wire in a twisted strand was braided in a counter clockwise helix. The inner core was formed in a straight configuration from the same co-extruded monofilaments as the outer braided jacket in an amount sufficient to fill the hollow core in the braided jacket. The breaking strength of rope of this construction was in the range of 1,000 to 1,500 kilograms.

Another rope was produced as a rope fence for use with horses and for rotational grazing. It was ¼ inch diameter braided rope produced on a 16 carrier braiding machine at 8 pics per inch. The non-conductive elements in the outer braided jacket were comprised of spun 1W70 polyester fibres manufactured by Allied Signal for automotive seat belts, twisted into strands. Polyester fibres are soft, and UV and abrasion resistant. The conductive elements were two twisted strands of 5 ends each of pure copper wire. The two conductive elements were braided with 14 non-conductive elements into helix configurations, clockwise and counter-clockwise. The non-conductive fibre elements were given an S-twist or a Z-twist to provide a smooth outer lay with all fibres aligned along the braided rope. The rope had an inner core of spun fibres of multi-filament polypropylene in a slightly twisted configuration filling the hollow core of the braided jacket. The breaking strength of this construction was in the range of 500 to 700 kilograms.

Accelerated Weathering Testing (ASTM G 53–96) showed no indication of product degradation during 1,000 hours of testing other than a slight yellowing. There was no cracking, no fraying, no indication of mould or fungus growth, no corrosion of the copper, and no significant loss of strength in periodic break tests. Field tests have shown no breakage or loss of electrical conductivity in normal farm operations due to abrasion, work hardening, or tensional forces and no harm or damage of any kind to animals.

Another rope was a 3/8 inch diameter fence rope for the purpose of keeping moose off highways to reduce moose—vehicle collisions. It had a braided polyester outer jacket with a braided inner sleeve of POLYSTEEL™ monofilaments, surrounding straight POLYSTEEL™ monofilaments, fully integrated during braiding in a so-called double braid construction. The outer braided jacket incorporated reflective light fibres and four copper conductive elements of twisted 30 gauge wires. The break test of this heavier fence rope was almost 2,000 kilograms.

In another example, a 1/8 inch diameter electric fence rope was produced on an 8 carrier braiding machine with a parallel-laid core. The braided jacket had polyester fibres and the core had multi-filament polypropylene fibres. Two strands of three ends each of 34 gauge copper wire were braided into the outer jacket in opposed helical configurations. Such a fence rope is intended for use with an existing fence, and has a break test strength of 200 kilograms.

The braided electric fence rope of this invention can be used to construct an electric fence that combines both the psychological deterrence of an electric shock with the strength and resilience to withstand applied force by animals. Embodiments of the fence rope of this invention have many added advantages: it is easy to install and to maintain; it is light weight; it is portable and flexible when needed; it reduces or eliminates disadvantages of electric high tensile wire e.g. as enumerated above on page 2; it may be made visible to animals; it does not cut the flesh of animals, or cause puncture wounds; and it may be manufactured and installed economically.

In embodiments, fencing made from the rope of the invention is easy to handle, may be run longer distances between posts, is flexible and has little stretch. It will not harm animals running into it, but it is strong enough to withstand that. The fence rope does not chafe, it does not crack or peel, and does not sag or break under wind and ice. It may be made highly visible against varied backgrounds, including snow and low light conditions, and especially against dark backgrounds e.g. wooded areas and to some extent at night. Fencing may be installed over varied terrain with a minimum of effort. After installation, the fence should not need retightening, and it does not need to be checked for breakage after wind storms. Snow and ice tend to fall off as soon as there is a light breeze.

What is claimed is:

1. An electrically conductive rope for an electric fence comprising a cylindrical tightly woven braided exterior layer, said braided exterior layer being formed from a plurality of elements, at least two of which are conductive elements and the remainder of which are non-conductive elements, each of said non-conductive elements being a plurality of synthetic fibres and each of said conductive elements made entirely of one or more conductive filaments, said conductive and non-conductive elements being separately braided to form said cylindrical tightly woven braided exterior layer such that the conductive elements are helically wound with opposed orientations, said conductive elements being on the surface of the exterior layer and being in electrical contact at periodic intervals along the exterior layer.

2. The rope of claim 1 in which the exterior layer of braided rope is constructed tightly with no inner core.

3. The rope of claim 2 in which each of the conductive elements is a single copper wire.

4. The rope of claim 2 in which the conductive elements are a plurality of copper wires, such copper wires being twisted together.

5. The rope of claim 1 in which the rope has an inner core of high strength non-conductive synthetic yarns.

6. The rope of claim 5 in which the braided exterior layer is formed from 8–32 braided elements with a tightness of 4–32 picks/inch.

7. The rope of claim 5 in which the rope is substantially non-extendible under tension.

8. The rope of claim 5 in which the rope has a breaking strength of at least 400 kg.

9. The rope of claim 8 in which the elongation at break is 15–20%.

10. The rope of claim 9 in which subjecting the rope to a load in tension of up to 200 kg and subsequently releasing such load does not cause an increase in the length of the rope.

11. The rope of claim 5 in which the non-conductive elements are formed from fibres selected from the group consisting of polyamide, polyester, polyethylene, polypropylene and aramid.

12. The rope of claim 5 in which the conductive element is a conductive filament.

13. The rope of claim 5 in which the conductive element is selected from the group consisting of copper wire, copper as a coating on another metal, copper as an alloy with another metal, and copper coated with another metal.

14. The rope of claim 5 in which the exterior layer comprises a single outer layer of braided elements including both electrically conductive and high strength non-conductive elements.

15. The rope of claim 5 in which there are multiple layers of braided elements, the exterior layer having conductive elements.

16. The rope of claim 5 in which the non-conductive elements are extruded monofilaments or spun yarn.

17. The rope of claim 5 in which the non-conductive elements are polyester.

18. The rope of claim 5 in which, under tension, the helical electrically conductive elements uncoil in the manner of a coiled spring.

19. The rope of claim 5 in which the outer braided layer comprises one or more fluorescent elements or one or more light reflective elements.

20. The rope of claim 5 in which the outer braided layer comprises high tenacity filaments with high visibility colours.

21. The rope of claim 5 in which the braided elements are marine yachting braiding.

22. The rope of claim 21 in which the braided elements are sail halyard braiding.

23. The rope of claim 5 in which the rope does not undergo a change in length with changes in ambient temperature.

24. The rope of claim 5 in which the braided construction is such that the inner core is comprised of elastic elements.

25. The rope of claim 5 in which the inner core is comprised of elements of straight or slightly twisted configuration.

26. The rope of claim 5 in which the inner core is comprised of elements combined in a braided configuration.

27. The rope of claim 5 in which each of the conductive elements is a single copper wire.

28. The rope of claim 27 in which there are two conductive elements.

29. The rope of claim 28 in which the braided exterior layer is formed from 8–32 braided elements formed with a tightness of 4–32 pick/inch.

30. The rope of claim 29 in which the copper wire has a gauge in the range of 20–30 American Wire Gauge Standard.

31. The rope of claim 29 in which the nonconductive braided fibres in the outer layer are polyester fibres.

32. The rope of claim 31 in which the inner core is formed from monofilament polypropylene.

33. The rope of claim 32 in which the rope has 16 braided elements formed at 8 picks/inch.

34. The rope of claim 5 in which the conductive elements are a plurality of copper wires, such copper wires being twisted together into two or more strands.

35. The rope of claim 34 in which there are 3–8 copper wires in each conductive element.

36. The rope of claim 35 in which the copper wires have a gauge in the range of 30–40 American Wire Gauge Standard (0.25–0.80 mm).

37. The rope of claim 5 in which the rope has a thickness of ⅛–⅜ inches.

38. An electrically conductive rope for an electric fence comprising a cylindrical tightly woven braided exterior layer, said braided exterior layer being formed from a plurality of elements, at least two of which are conductive elements and the remainder of which are non-conductive elements, each of said non-conductive elements being a plurality of synthetic fibres and each of said conductive elements being braided to form said cylindrical tightly woven braided exterior layer such that the conductive elements are helically wound with opposed orientations, said conductive elements being on the surface of the exterior layer and being in electrical contact at periodic intervals along the exterior layer, said braided exterior layer being constructed tightly with no inner core.

39. The rope of claim 38 in which each of the conductive elements is a single copper wire.

40. The rope of claim 38 in which the conductive elements are a plurality of copper wires, such copper wires being twisted together.

41. An electrically conductive rope for an electric fence comprising a cylindrical tightly woven braided exterior layer, said braided exterior layer being formed from a plurality of elements, at least two of which are conductive elements and the remainder of which are non-conductive elements, each of said non-conductive elements being a plurality of synthetic fibres and each of said conductive elements being at least one electrically conductive wire, said conductive and non-conductive elements being braided to form said cylindrical tightly woven braided exterior layer such that the conductive elements are helically wound with opposed orientations, said conductive elements being on the surface of the exterior layer and being in electrical contact at periodic intervals along the exterior layer, said rope having an inner core of high strength non-conductive synthetic yarns and said braided exterior layer formed from 8–32 braided elements with a tightness of 4–32 picks/inch.

42. The rope of claim 41 in which the rope is substantially non-extendible under tension.

43. The rope of claim 41 in which the conductive elements are a plurality of copper wires, such copper wires being twisted together into two or more strands.

44. The rope of claim 43 in which there are 3–8 copper wires in each conductive element.

45. The rope of claim 44 in which the copper wires have a gauge in the range of 30–40 American Wire Gauge Standard (0.25–0.80 mm).

46. The rope of claim 41 in which the rope has a thickness of ⅛–⅜ inches.

47. The rope of claim 41 in which the rope has a breaking strength of at least 400 kg.

48. The rope of claim 47 in which the elongation at break is 15–20%.

49. The rope of claim 48 in which subjecting the rope to a load in tension of up to 200 kg and subsequently releasing such load does not cause an increase in the length of the rope.

50. An electrically conductive rope for an electric fence comprising a cylindrical tightly woven braided exterior layer, said braided exterior layer being formed from a plurality of elements, two of which are conductive elements and the remainder of which are non-conductive elements, each of said non-conductive elements being a plurality of synthetic fibres and each of said conductive elements being an electrically conductive copper wire, said conductive and non-conductive elements being braided to form said cylindrical tightly woven braided exterior layer such that the conductive elements are helically wound with opposed orientations, said conductive elements being on the surface of the exterior layer and being in electrical contact at periodic intervals along the exterior layer, said rope having an inner core of high strength non-conductive synthetic yarns, said braided exterior layer being formed from 8–32 braided elements formed with a tightness of 4–32 pick/inch.

51. The rope of claim 50 in which the copper wire has a gauge in the range of 20–30 American Wire Gauge Standard.

52. The rope of claim 50 in which the non-conductive braided elements in the exterior layer are polyester fibres.

53. The rope of claim 52 in which the inner core is formed from monofilament polypropylene.

54. The rope of claim 53 in which the rope has 16 braided elements formed at 8 picks/inch.

55. An electrically conductive rope for an electric fence comprising a cylindrical tightly woven braided exterior layer, said braided exterior layer being formed from a plurality of elements, at least two of which are conductive elements and the remainder of which are non-conductive elements, each of said non-conductive elements being a plurality of synthetic fibres and each of said conductive elements being at least one electrically conductive wire, said conductive and non-conductive elements being braided to form said cylindrical tightly woven braided exterior layer such that the conductive elements are helically wound with opposed orientations, said conductive elements being on the surface of the exterior layer and being in electrical contact at periodic intervals along the exterior layer, wherein the rope has an inner core of high strength non-conductive synthetic yarns, and wherein the conductive elements are a plurality of copper wires, such copper wires being twisted together into two or more strands.

56. An electrically conductive rope for an electric fence comprising a cylindrical tightly woven braided exterior layer, said braided exterior layer being formed from a plurality of elements, at least two of which are conductive elements and the remainder of which are non-conductive elements, each of said non-conductive elements being a plurality of synthetic fibres and each of said conductive elements being at least one electrically conductive wire, said conductive and non-conductive elements being braided to form said cylindrical tightly woven braided exterior layer such that the conductive elements are helically wound with opposed orientations, said conductive elements being on the surface of the exterior layer and being in electrical contact at periodic intervals along the exterior layer, wherein the rope has an inner core of high strength non-conductive synthetic yarns, and wherein the rope has a thickness of $1/8$–$3/8$ inches.

\* \* \* \* \*